US011064320B2

(12) United States Patent
Dormody et al.

(10) Patent No.: US 11,064,320 B2
(45) Date of Patent: Jul. 13, 2021

(54) SYSTEMS AND METHODS FOR USING A PRESSURE SENSOR OF A MOBILE DEVICE TO IMPROVE THE RELIABILITY OF DETERMINED CONTEXTS

(71) Applicant: NextNav, LLC, Sunnyvale, CA (US)

(72) Inventors: Michael Dormody, San Jose, CA (US); Arun Raghupathy, Bangalore (IN); Badrinath Nagarajan, San Francisco, CA (US); Guiyuan Han, San Jose, CA (US)

(73) Assignee: NextNav, LLC, Sunnyvale, CA (US)

( * ) Notice: Subject to any disclaimer, the term of this patent is extended or adjusted under 35 U.S.C. 154(b) by 0 days.

(21) Appl. No.: 15/930,289

(22) Filed: May 12, 2020

(65) Prior Publication Data
US 2021/0006951 A1  Jan. 7, 2021

Related U.S. Application Data

(60) Provisional application No. 62/870,717, filed on Jul. 4, 2019.

(51) Int. Cl.
H04W 4/38 (2018.01)
H04W 4/029 (2018.01)
H04W 4/02 (2018.01)
H04W 64/00 (2009.01)

(52) U.S. Cl.
CPC ............ H04W 4/38 (2018.02); H04W 4/025 (2013.01); H04W 4/029 (2018.02); H04W 64/006 (2013.01)

(58) Field of Classification Search
CPC .................. A61B 5/1118; A61B 5/681; A61B 2562/0247; H04W 4/02; H04W 4/027; H04W 4/029; H04W 4/026; H04W 4/38
See application file for complete search history.

(56) References Cited

U.S. PATENT DOCUMENTS

| | | | |
|---|---|---|---|
| 2014/0149060 A1* | 5/2014 | Meduna | G06F 1/324 702/94 |
| 2015/0087264 A1* | 3/2015 | Goyal | G01S 19/34 455/411 |
| 2016/0205238 A1* | 7/2016 | Abramson | G01C 21/3641 455/456.4 |
| 2016/0245716 A1* | 8/2016 | Gum | G01L 27/002 |
| 2017/0276483 A1 | 9/2017 | Dormody | |
| 2018/0087909 A1 | 3/2018 | Ju-Yong | |

(Continued)

OTHER PUBLICATIONS

Kartik Sankaran et al, "Using Mobile Phone Barometer for Low-Power Transportation Context Direction", Embedded Network Sensor Systems, ACM, 2 Penn Plaza, Suite 701 New York, NY 10121-0701 USA, Nov. 3, 2014, pp. 191-205, XP058059643, DOI 10.1145/2668332.2668343, ISBN 978-1-4503-3143-2.

(Continued)

Primary Examiner — Kwasi Karikari
(74) Attorney, Agent, or Firm — MLO, a professional corp.

(57) ABSTRACT

Using a pressure sensor of a mobile device to improve the reliability of determined contexts. Particular embodiments described herein include machines that determine a context of a mobile device, and determine if the determined context is accurate using one or more measurements of pressure from a pressure sensor of the mobile device.

18 Claims, 9 Drawing Sheets

(56) References Cited

U.S. PATENT DOCUMENTS

2018/0094998 A1* 4/2018 Youssef ............... G01L 27/005
2018/0114133 A1   4/2018 Chowdhary

OTHER PUBLICATIONS

Form PCT/ISA/206, PCT/US2020/032526, "Invitation to Pay Addition Fees and, Where Applicable, Protest Fee", 4 page(s); EPO Form P04A42, PCT/US2020/032526, "Information on Search Strategy", 1 page(s); EPO Form 1707, PCT/US2020/032526, "Provisional Opinion", 8 page(s); dated Aug. 19, 2020.
International Search Report dated Oct. 12, 2020 for PCT Patent Application No. PCT/US20/32526.
Sankaran, et al., Using Mobile Phone Barometer for Low-Power Transportation Context Detection, Nov. 2014, 15 pgs, ACM, Memphis, TN.

* cited by examiner

SYSTEMS AND METHODS FOR USING A PRESSURE SENSOR OF A MOBILE DEVICE TO IMPROVE THE RELIABILITY OF DETERMINED CONTEXTS

BACKGROUND

The context of a mobile device, such as a smartphone, can be determined using different information that is collected by the mobile device. Examples of contexts include, but are not limited to, determining that the mobile device: is in a moving motorized vehicle; is with a user who is traveling between floors of a building; is with a user who is walking; is still; has been dropped; or other contexts known in the art.

Different types of information can be collected by a mobile device for use in determining a context of that mobile device. For example, vector movement indicative of particular movement—e.g., walking, driving, remaining still, falling, moving up or down on a vertical axis, or moving up or down along an angular axis—can be estimated using inertial sensor measurements from an accelerometer or other inertial sensor, or some of these movements can be estimated using a series of computed position estimates over time.

When a context is determined, a confidence value that estimates the reliability or accuracy of the context can be determined. Confidence values can be represented in different forms, and are usually provided as a percentage, such as 50% confidence, but could be provided in other ways, such as using relative terms like High confidence, Good confidence, Weak confidence, or Poor confidence. In some cases, no confidence value is available. In other cases, high confidence values are not available (e.g., when an inertial sensor has drifted and no longer provides accurate measurements; e.g., when positioning signals include multipath error). It follows that there is a need for improved approaches that determine contexts of mobile devices with more certainty.

DETAILED DESCRIPTION

Figure 1:
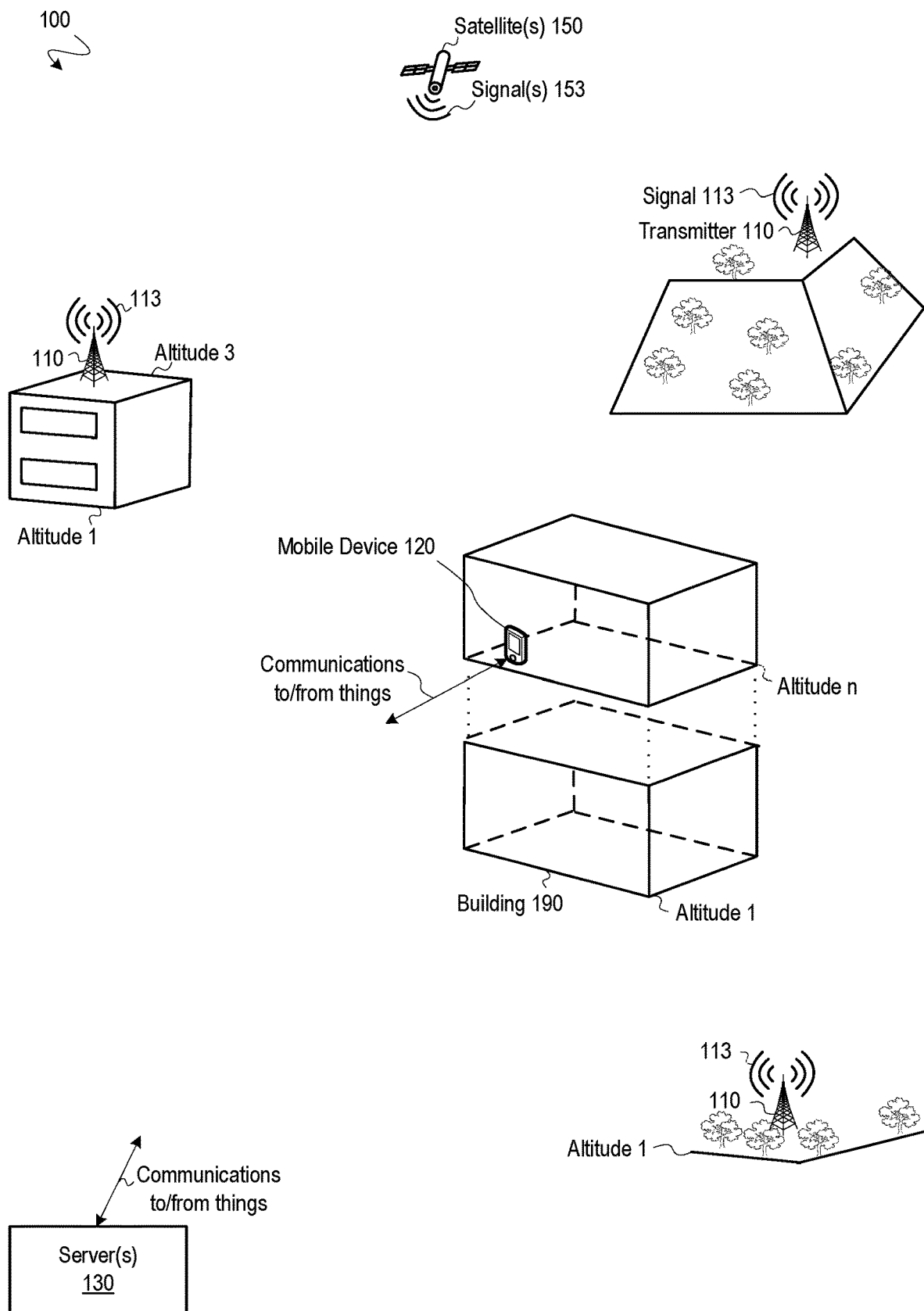
FIG. 1 depicts an operational environment in which systems and methods for using a pressure sensor of a mobile device to improve the reliability of determined contexts may operate.

Understanding a status of a mobile device, such as a smartphone, can be used to identify circumstances of interest (e.g., a particular location of the mobile device, any movement of the mobile device, environmental conditions affecting the mobile device, or other circumstances). Once identified, a circumstance of interest can be used to control particular operations of the mobile device—e.g., the circumstances may indicate that measurements of pressure from a pressure sensor of the mobile device will be reliable enough to calibrate the pressure sensor or to compute an estimated altitude of the mobile device, or the circumstances may indicate other things that affect other operations known in the art.

The status of a mobile device can be represented as a context of that mobile device. The reliability of a context is highly dependent on the accuracy of underlying information used to determine the context. Underlying information used to determine a context can result in determining a context with a level of certainty that does not meet a threshold condition (e.g., a confidence value that does not exceed a threshold level of confidence). Underlying information used to determine a context can also result in determining a context with a level of certainty that inaccurately over-states the likelihood of that context (e.g., a confidence value that is higher than the actual likelihood of the context). As discussed further below, the reliability of a determined context can be improved using measurements from a pressure sensor of the mobile device.

Pressure measurements from pressure sensors of mobile devices can advantageously be used to provide additional certainty as to the accuracy of determined contexts compared to approaches that do not consider measurements of pressure. By way of example, measurements of pressure can be used to confirm a previously-determined context, to decrease the likelihood of a previously-determined context, to indicate no adjustment to the likelihood of a context being true can be discerned from pressure measurements, or to identify another possible context. Different approaches for evaluating determined contexts using measurements of pressure from pressure sensors of mobile devices are summarized below.

Likelihood of the device being with user in a motorized vehicle: Pressure measurements from a pressure sensor can be used to detect "turbulent" air that is expected to be colliding with and leaking into a motorized vehicle in which the mobile device is expected to reside, which can be used to confirm or increase the likelihood that the mobile device is in a motorized vehicle. For reference, air that is "turbulent" can be identified when there is an increased spread of a distribution of pressure measurements compared to a spread of a distribution of pressure measurements associated with circumstances when the mobile device is not in a moving motorized vehicle (e.g., is with a walking user or is still and not moving). Alternatively, pressure measurements from a pressure sensor can be used to detect little or no changes in pressure over a time scale (e.g., less than a threshold amount of pressure change over a several minutes), or to detect no turbulent airflow, which can be inconclusive or used to reduce the likelihood of the mobile device being in a motorized vehicle, and optionally may result in a new context being determined.

Likelihood of device being with user who is walking: Pressure measurements of a pressure sensor can be used to detect turbulent airflow, which can be used to decrease the likelihood that the mobile device is with a user who is walking, and optionally may result in a new context being determined (e.g., the mobile device is in a motorized vehicle). If the context specifies that the mobile device is traveling between floors, pressure measurements from a pressure sensor over a short timescale (e.g., less than 1 minute) can be used to detect differences between successive measured pressures that all are within a threshold range of pressure, or a rate of pressure change in one direction over the timescale that meets a threshold condition (e.g., is within a range of expected rates associated with ascending or descending), which can be used to confirm or increase the likelihood that the mobile device is ascending or descending among floors. Alternatively, not detecting the differences or the rate over the timescale can be used to decrease the likelihood that the mobile device is ascending or descending among floors. If the context specifies the mobile device has entered or exited a building, car or other environment, pressure measurements from a pressure sensor can be used to detect a sudden change in pressure, and a further determination can be made that the mobile device is not traveling between floors (e.g., by determining if measurements of inertial sensors that indicate distance traveled along a vertical access does not exceed a threshold amount vertical distance such as 1 or more meters, or by detecting no threshold rate of pressure change over a timescale), which can be used to confirm or increase the likelihood that the mobile device entered or exited an environment with an active HVAC system. Alternatively, not detecting the sudden change in pressure can be used to decrease the likelihood that the mobile device is entering or exiting an environment with an active HVAC system that could be creating an inaccurate, localized pressure.

Likelihood of device being still: Pressure measurements from a pressure sensor can be used to detect little or no changes in pressure over a time scale (e.g., less than a threshold amount of pressure change over a several minutes), which can be used to confirm or increase the likelihood that the mobile device is still and not moving. If a mobile device is known to be outside (e.g., based on an estimated position), pressure measurements from a pressure sensor can be used to detect any sudden change in pressure, which can be used to decrease the likelihood that the mobile device is still, and optionally may result in a new context being determined (e.g., the mobile device was dropped). Pressure measurements from a pressure sensor can be used to detect a steady change over a small timescale (e.g., over several minutes, detect increases or decreases of measured pressure every 30 seconds that are within a threshold range of increases or decreases), which can be used to decrease the likelihood that the mobile device is still, and optionally may result in a new context being determined (e.g., the mobile device is with a user who is walking).

Likelihood of the device having been dropped: Pressure measurements from a pressure sensor can be used to detect a sudden pressure change along with a new pressure value that is sustained after the sudden pressure change compared to a previous pressure value that was sustained before the sudden pressure change, which can be used to confirm or increase the likelihood that the mobile device was dropped from one altitude to another altitude. Alternatively, pressure measurements from a pressure sensor can be used to detect a sudden pressure change along with a pressure value sustained after the sudden pressure change that matches a previous pressure value sustained before the sudden pressure change, which can be used to decrease the likelihood that the mobile device was dropped over a significant distance (e.g., since it may be likely that the mobile device was hit by a fallen object, bumped something, or raised a short distance (e.g., an inch or less) from a surface and returned roughly to the surface, which represents negligible change in altitude.

Figure 8:
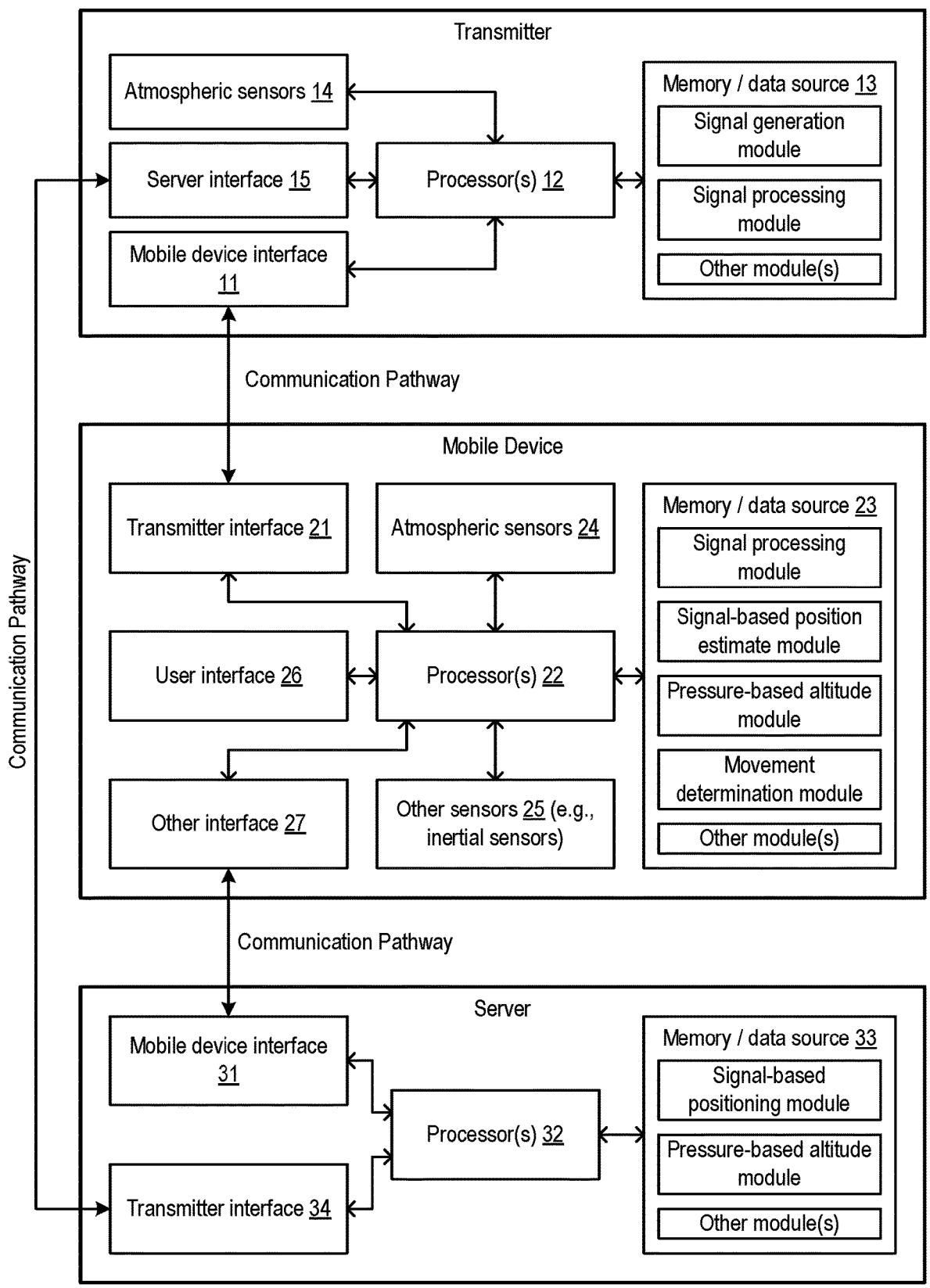
FIG. 8 illustrates components of a transmitter, a mobile device, and a server.

Additional details regarding different approaches for evaluating determined contexts using measurements of pressure from pressure sensors of mobile devices are discussed further below after a brief description of an operational environment 100 illustrated in FIG. 1 in which systems and methods for using a pressure sensor of a mobile device to improve the reliability of determined contexts may operate. As shown in FIG. 1, the environment 100 includes a network of terrestrial transmitters 110, at least one mobile device 120, and a server 130. Each of the transmitters 110 and the mobile device 120 may be located at different altitudes or depths that are inside or outside various natural or manmade structures (e.g. buildings) 190. Positioning signals 113 and 153 are respectively transmitted from the transmitters 110 and the satellites 150, and received by the mobile device 120 using known transmission technologies. The transmitters 110 may transmit the signals 113 using one or more common multiplexing parameters—e.g. time slot, pseudorandom sequence, frequency offset, or other, as is known in the art or otherwise disclosed herein. The mobile device 120 may take different forms, including a mobile phone or other wireless communication device, a portable computer, a navigation device, a tracking device, a receiver, or another suitable device that can receive the signals 113 and/or 153. Examples of possible components in the transmitters 110, the mobile device 120, and the server 130 are shown in FIG. 8 and discussed in the 'Other Aspects' section of this disclosure. In particular, the mobile device 120 may include a pressure sensors for generating measurements of pressure that are used to improve the reliability of determined contexts for the mobile device 120.

Figure 2:
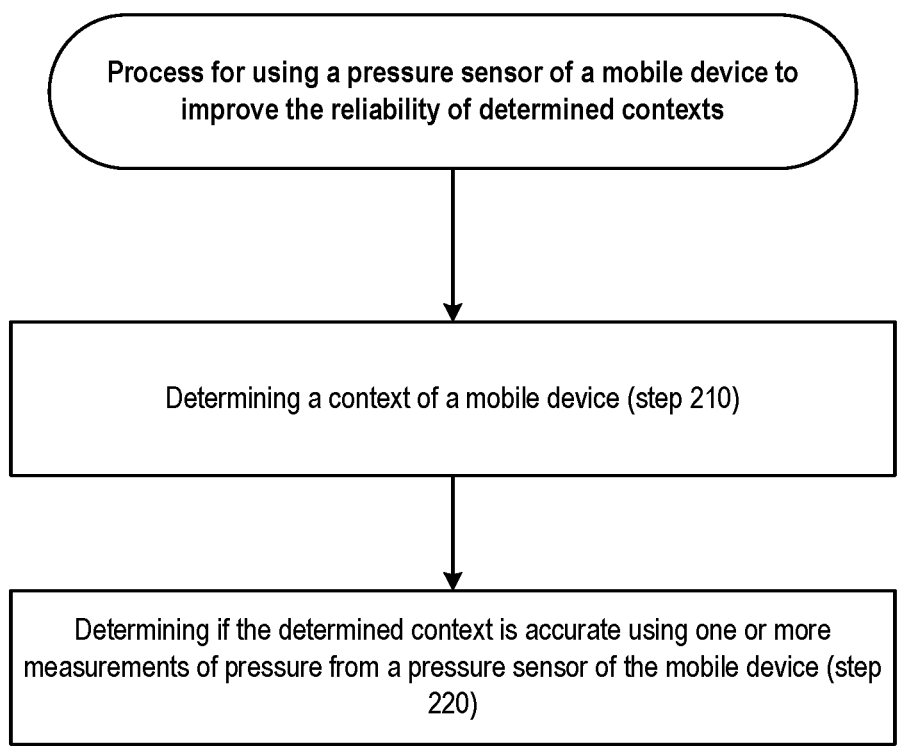
FIG. 2 depicts a process for using a pressure sensor of a mobile device to improve the reliability of determined contexts.

Using a Pressure Sensor of a Mobile Device to Improve the Reliability of Determined Contexts A process for using a pressure sensor of a mobile device to improve the reliability of determined contexts is shown in FIG. 2 and described below. The process comprises the following steps: determining a context of a mobile device (step 210); and determining if the determined context is accurate using one or more measurements of pressure from a pressure sensor of the mobile device (step 220).

Different approaches for determining a context of a mobile device during step 210 are available in the art. Many approaches use an application programming interface (API) of the mobile device to acquire information from one or more features of the mobile device, and then evaluate the acquired information to determine a context. Acquired information can be used to identify locations of a mobile device, movement or non-movement of the mobile device, operating conditions of the mobile device, and other aspects of a mobile device. Examples of acquired information may include: information from the mobile device's positioning chip specifying an estimated position of the mobile device; information from the mobile device's inertial sensors specifying movement and orientation of the mobile device; information from the mobile device's camera specifying images captured by the camera; information from the mobile device's microphone specifying sounds captured by the camera; information from the mobile device's battery status specifying whether the mobile device is charging; or other information from other features of the mobile device.

Different embodiments for determining if a determined context is accurate using one or more measurements of pressure from the pressure sensor of the mobile device during step 220 are described below for particular contexts.

Determined Context Specifies that the Mobile Device is in a Motorized Vehicle

Figure 3A:
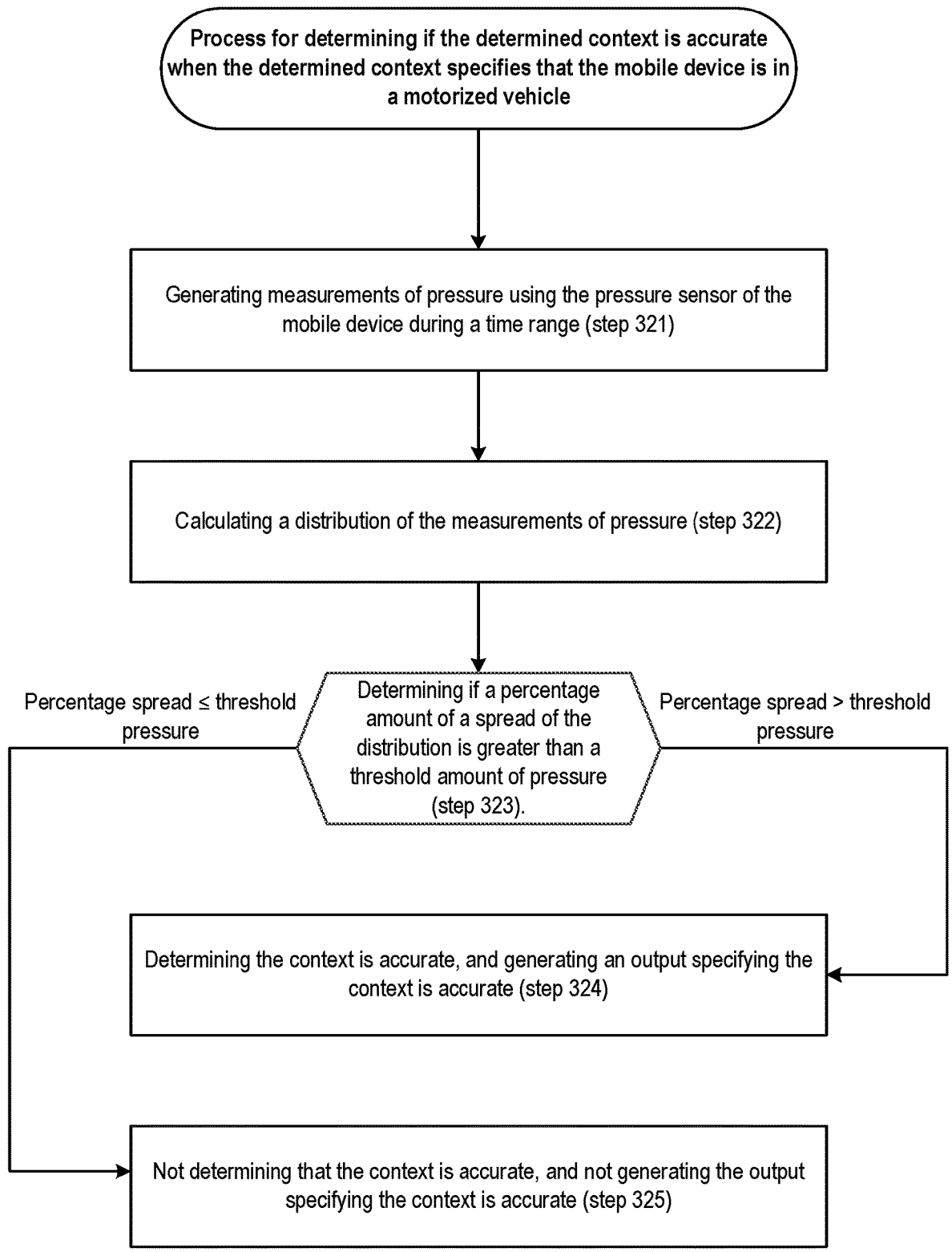
FIG. 3A depicts a process for determining if the determined context is accurate when the determined context specifies that the mobile device is in a motorized vehicle.

FIG. 3A depicts a process for determining if the determined context is accurate when the determined context specifies that the mobile device is in a motorized vehicle.

During the process of FIG. 3A, measurements of pressure are generated using the pressure sensor of the mobile device during a time range (step 321), and a number of the measurements of pressure is determined. In one implementation of step 321, measurements are determined over a time range of at least 10 seconds. Of course, other implementations may use different time ranges during which various numbers of pressure measurements are generated.

A distribution of the measurements of pressure is determined (step 322), and a determination is made as to whether a percentage amount of a spread of the distribution is greater than a threshold amount of pressure (step 323). In one implementation of step 323, a determination is made if 50% of the spread, such as the interquartile range of the spread, is greater than 10 Pa. In another implementation of step 323, a determination is made if 95% of the spread is greater than 15 Pa. Of course, other implementations may use different percentage amounts of the spread and different threshold amounts of pressure.

If the percentage amount of the spread is greater than the threshold amount of pressure, a determination that the context is accurate is made, and an output specifying the context is accurate is generated (step 324). Examples of generated output specifying the context is accurate include a value designating "High Confidence" in the context.

If the percentage amount of the spread is not greater than the threshold amount of pressure, no determination that the context is accurate is made, and no output specifying the context is accurate is generated (step 325). Some embodiments include additional operations during step 325. In one embodiment, step 325 further includes: determining that it is not possible to determine that the context is accurate; and generating an output specifying it is not possible to determine that the context is accurate. Examples of generated output specifying it is not possible to determine that the context is accurate include a value designating "Unknown Accuracy" of the context. In another embodiment, step 325 further includes: determining that the context is inaccurate; and generating output specifying the context is inaccurate. Examples of generated output specifying the context is inaccurate include a value designating the context is "Inaccurate". In yet another embodiment, step 325 further includes: determining that the context is inaccurate; and generating output specifying that the mobile device is with a user who is walking or riding a bike. Examples of generated output specifying the mobile device is with a user who is walking or riding a bike include a value designating "High Confidence in Other Context" (e.g., Walk/Cycle).

Figure 3B:
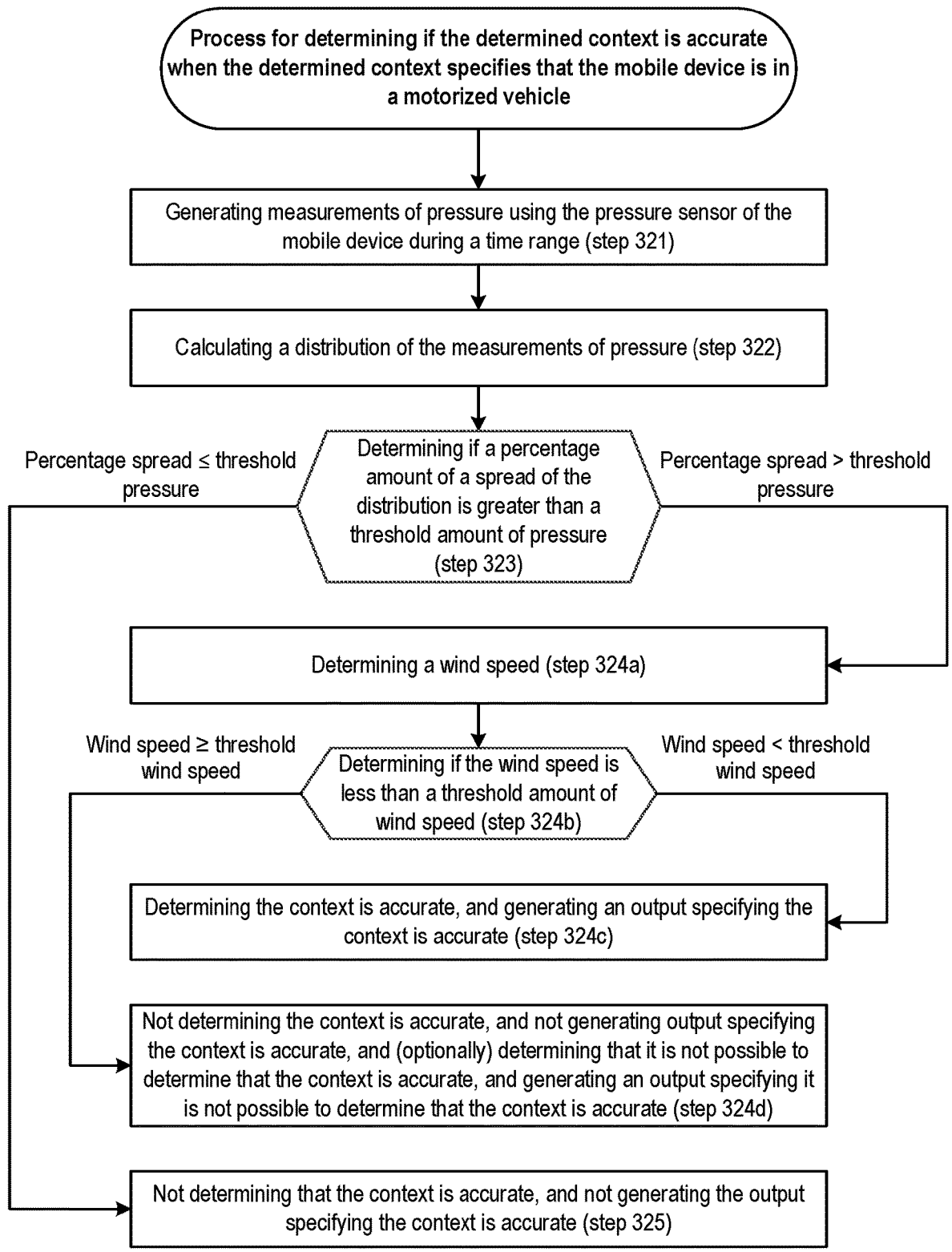
FIG. 3B depicts another process for determining if the determined context is accurate when the determined context specifies that the mobile device is in a motorized vehicle.

FIG. 3B depicts another process for determining if the determined context is accurate when the determined context specifies that the mobile device is in a motorized vehicle.

During the process of FIG. 3B, measurements of pressure are generated using the pressure sensor of the mobile device during a time range (step 321). In one implementation of step 321, measurements are determined over a time range of at least 10 seconds. Of course, other implementations may use different time ranges during which various numbers of pressure measurements are determined.

A distribution of the measurements of pressure is determined (step 322), and a determination is made as to whether a percentage amount of a spread of the distribution is greater than a threshold amount of pressure (step 323).

If the percentage amount of the spread is greater than the threshold amount of pressure, a wind speed is determined (step 324*a*)—e.g., by determining an estimated position of the mobile device, and acquiring a wind speed in an area that includes the estimated position (e.g., from a weather service API), or using any known approach for determining a wind speed. A determination as to whether the wind speed is less than a threshold amount of wind speed is made (step 324*b*). In one implementation, the threshold amount of wind is 10 mph, but other values can be used depending on implementation. If the wind speed is less than the threshold amount of wind speed, a determination that the context is accurate is made, and an output specifying the context is accurate is generated (step 324*c*). If the wind speed is not less than the threshold amount of wind speed, no determination that the context is accurate is made, and the output specifying the context is accurate is not generated (step 324*d*). Optionally, in one embodiment of step 324*d*, a determination that it is not possible to determine that the context is accurate is made, and an output specifying it is not possible to determine that the context is accurate is generated.

If the percentage amount of the spread is not greater than the threshold amount of pressure, no determination that the context is accurate is made, and no output specifying the context is accurate is generated (step 325).

Figure 4:
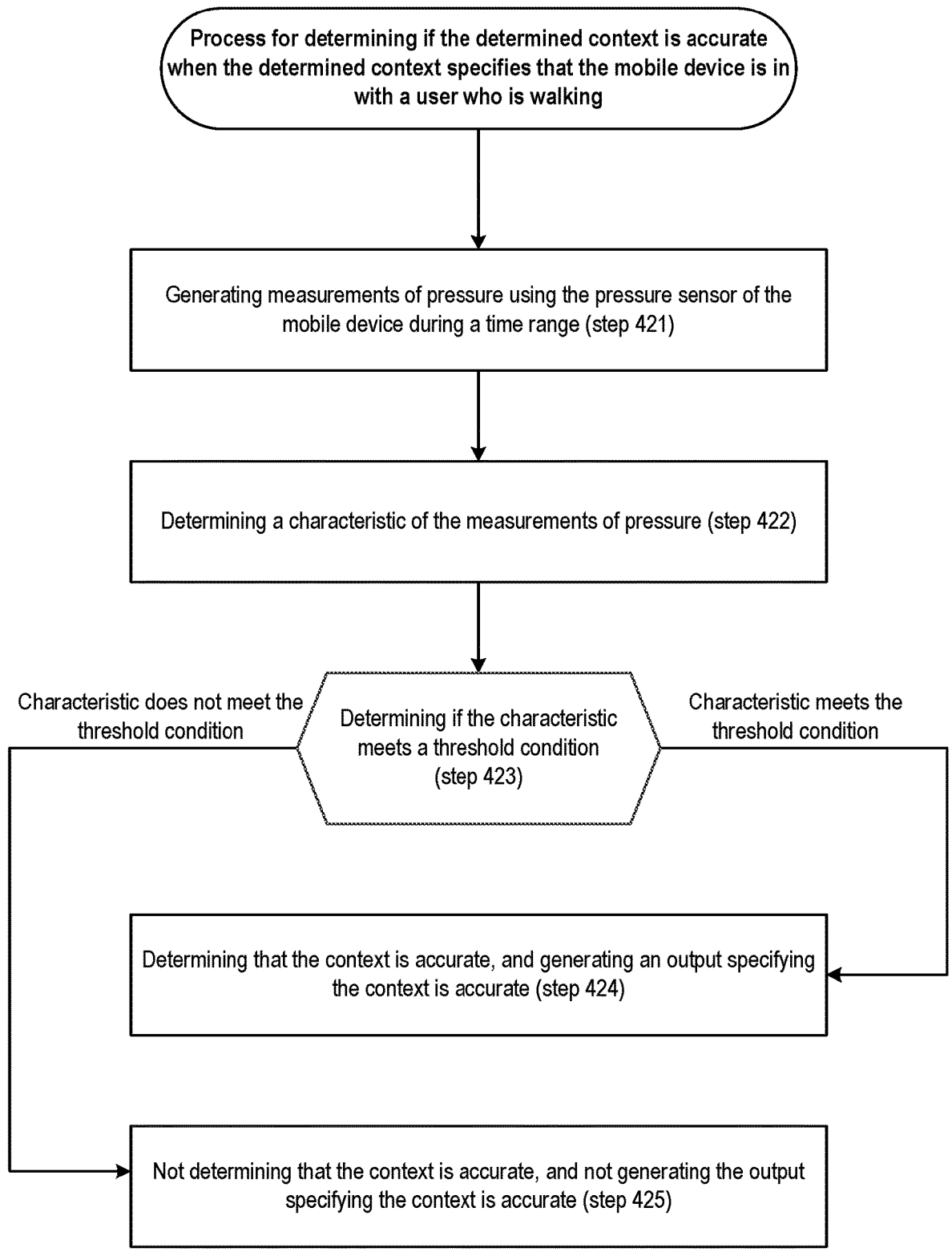
FIG. 4 depicts a process for determining if the determined context is accurate when the determined context specifies that the mobile device is with a user who is walking.

Determined Context Specifies that the Mobile Device is with a User Who is Walking FIG. 4 depicts a process for determining if the determined context is accurate when the determined context specifies that the mobile device is with a user who is walking.

During the process, measurements of pressure are generated using the pressure sensor of the mobile device during a time range (step 421). The measurements of pressure include a first pressure measurement determined at or near (e.g., within a threshold amount of time since) the beginning of the time range, and a second pressure measurement determined at or near (e.g., within the threshold amount of time before) the end of the time range. In one implementation of step 421, the time range is at least 10 seconds. Of course, other implementations may use different numbers of measurements and time ranges.

After generation of the pressure measurements, a characteristic of the measurements of pressure is determined (step 422). Examples of characteristics include: (i) a difference between the first pressure measurement and the second pressure measurement; (ii) a trendline of the measurements of pressure (e.g., a best-fit trendline to a profile of pressures); or (iii) a distribution of the measurements of pressure.

After determination of the characteristic, a determination as to whether the characteristic meets a threshold condition is made (step 423).

If the characteristic meets the threshold condition, a determination that the context is accurate is made, and an output specifying the context is accurate is generated (step 424).

If the characteristic does not meet the threshold condition, no determination that the context is accurate is made, and the output specifying the context is accurate is not generated (step 425). Some embodiments include additional operations during step 425. In one embodiment, step 425 further includes: determining that it is not possible to determine that the context is accurate; and generating an output specifying it is not possible to determine that the context is accurate. In another embodiment, step 425 further includes: determining that the context is inaccurate; and generating output specifying the context is inaccurate.

In a first embodiment of the process shown in FIG. 4, (i) determining a characteristic of the measurements of pressure during step 422 comprises determining a difference between the first pressure measurement and the second pressure measurement, (ii) determining if the characteristic meets a threshold condition during step 423 comprises determining if the difference between the first pressure measurement and the second pressure measurement is greater than a threshold amount of pressure (e.g., 20 Pa or another value), (iii) the characteristic meets the threshold condition during step 424 when the difference between the first pressure measurement and the second pressure measurement is greater than the threshold amount of pressure, and (iv) the characteristic does not meet the threshold condition during step 425 when the difference between the first pressure measurement and the second pressure measurement is not greater than the threshold amount of pressure.

In a second embodiment of the process shown in FIG. 4, (i) determining a characteristic of the measurements of pressure during step 422 comprises determining a trendline of the measurements of pressure throughout the time range, (ii) determining if the characteristic meets a threshold condition during step 423 comprises determining if a magnitude (e.g., absolute value) of a slope of the trendline is greater than a threshold amount of pressure per unit of time (e.g., 2 Pa/s or another value), (iii) the characteristic meets the threshold condition during step 424 when the magnitude of the slope of the trendline is greater than the threshold amount of pressure per unit of time, and (iv) the characteristic does not meet the threshold condition during step 425 when the magnitude of the slope of the trendline is not greater than the threshold amount of pressure per unit of time.

In a third embodiment of the process shown in FIG. 4, (i) determining a characteristic of the measurements of pressure during step 422 comprises determining a distribution of the measurements of pressure, (ii) determining if the characteristic meets a threshold condition during step 423 comprises determining if a percentage amount of a spread of the distribution is less than a threshold amount of pressure (e.g., the middle 50% of the spread is less than 10 Pa, 95% of the spread is less than 15 Pa, or other values), (iii) the characteristic meets the threshold condition during step 424 when the percentage amount of the spread of the distribution is less than the threshold amount of pressure, and (iv) the characteristic does not meet the threshold condition during step 425 when the percentage amount of the spread of the distribution is not less than the threshold amount of pressure. In one embodiment, step 425 further includes: determining that the context is inaccurate; and generating output specifying that the mobile device is in a motorized vehicle. In another embodiment, step 425 further includes: determining that it is not possible to determine that the context is accurate, and generating an output specifying it is not possible to determine that the context is accurate.

Determined Context Specifies that the Mobile Device is Still

Figure 5:
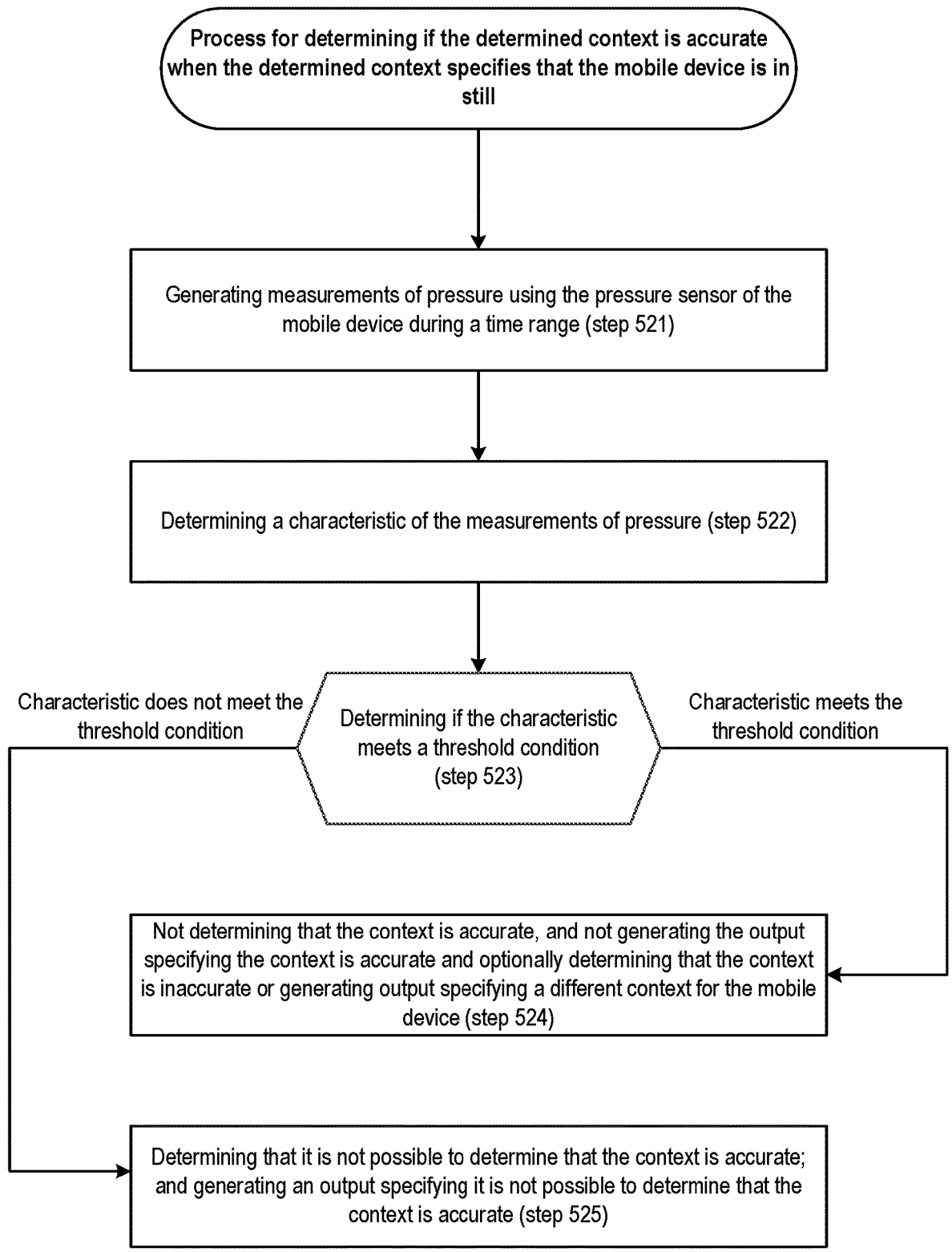
FIG. 5 depicts a process for determining if the determined context is accurate when the determined context specifies that the mobile device is still.

FIG. 5 depicts a process for determining if the determined context is accurate when the determined context specifies that the mobile device is still.

During the process, measurements of pressure are generated using the pressure sensor of the mobile device during a time range (step 521). The measurements of pressure include a first pressure measurement determined at or near the beginning of the time range, and a second pressure measurement determined at or near the end of the time range. In one implementation of step 521, the time range is at least 10 seconds. Of course, other implementations may use different numbers of measurements and time ranges.

After generation of the pressure measurements, a characteristic of the measurements of pressure is determined (step 522). Examples of characteristics include: (i) a difference between the first pressure measurement and the second pressure measurement; (ii) a trendline of the measurements of pressure (e.g., a best-fit trendline to a profile of pressures); or (iii) a distribution of the measurements of pressure.

After determination of the characteristic, a determination as to whether the characteristic meets a threshold condition is made (step 523).

If the characteristic meets the threshold condition, no determination that the context is accurate is made, and no output specifying the context is accurate is generated (step 524). Some embodiments include additional operations during step 524. In one embodiment, step 524 further includes: determining that the context is inaccurate, and generating an output specifying the context is inaccurate. In another embodiment, step 524 further includes: generating output specifying a different context for the mobile device (e.g. in a motorized vehicle, with a user who is walking, with a user who is traveling between floors, in an environment with possible severe weather conditions affecting pressure, in an environment with a possible HVAC localized pressure zone). In yet another embodiment, step 524 further includes: determining that the mobile device may be in an environment with possible severe weather conditions, or in an environment with a possible HVAC localized pressure zone, such that it is not possible to determine that the context is accurate; and generating an output specifying it is not possible to determine that the context is accurate.

If the characteristic does not meet the threshold condition, a determination is made that it is not possible to determine that the context is accurate; and an output specifying it is not possible to determine that the context is accurate is generated.

In a first embodiment of the process shown in FIG. 5, (i) determining a characteristic of the measurements of pressure during step 522 comprises determining a difference between the first pressure measurement and the second pressure measurement, (ii) determining if the characteristic meets a threshold condition during step 523 comprises determining if the difference between the first pressure measurement and the second pressure measurement is greater than a threshold amount of pressure (e.g., 20 Pa or another value), (iii) the characteristic meets the threshold condition during step 524 when the difference between the first pressure measurement and the second pressure measurement is greater than the threshold amount of pressure, and (iv) the characteristic does not meet the threshold condition during step 525 when the difference between the first pressure measurement and the second pressure measurement is not greater than the threshold amount of pressure. In one implementation, step 524 further includes: generating output specifying that the mobile device is with a user who is walking, or is with a user who is traveling between floors. In another implementation, step 524 further includes: generating output specifying that the mobile device may be in an environment experiencing severe weather or may be in an environment with changing HVAC conditions (which prevents any conclusion as to accuracy).

In a second embodiment of the process shown in FIG. 5, (i) determining a characteristic of the measurements of pressure during step 522 comprises determining a trendline of the measurements of pressure throughout the time range, (ii) determining if the characteristic meets a threshold condition during step 523 comprises determining if a magnitude (e.g., absolute value) of a slope of the trendline is greater than a threshold amount of pressure per unit of time (e.g., 2 Pa/s or another value), (iii) the characteristic meets the threshold condition during step 524 when the magnitude of the slope of the trendline is greater than the threshold amount of pressure per unit of time, and (iv) the characteristic does not meet the threshold condition during step 525 when the magnitude of the slope of the trendline is not greater than the threshold amount of pressure per unit of time. In one implementation, step 524 further includes: generating output specifying that the mobile device is with a user who is walking. In another implementation, step 524 further includes: generating output specifying that the mobile device is in an environment where an HVAC system in believed to be or have been creating a localized pressure zone.

In a third embodiment of the process shown in FIG. 5, (i) determining a characteristic of the measurements of pressure during step 522 comprises determining a distribution of the measurements of pressure, (ii) determining if the characteristic meets a threshold condition during step 523 comprises determining if a percentage amount of a spread of the distribution is greater than a threshold amount of pressure (e.g., the middle 50% of the spread is greater than 10 Pa, 95% of the spread is greater than 15 Pa, or other values), (iii) the characteristic meets the threshold condition during step 524 when the percentage amount of the spread of the distribution is greater than the threshold amount of pressure, and (iv) the characteristic does not meet the threshold condition during step 525 when the percentage amount of the spread of the distribution is not greater than the threshold amount of pressure. In one implementation embodiment, step 524 further includes: generating output specifying that the mobile device is in a motorized vehicle. In one implementation, step 525 further includes: determining that the context is inaccurate; and generating output specifying that the mobile device is in a motorized vehicle.

Determined Context Specifies that the Mobile Device has been Dropped

Figure 6:
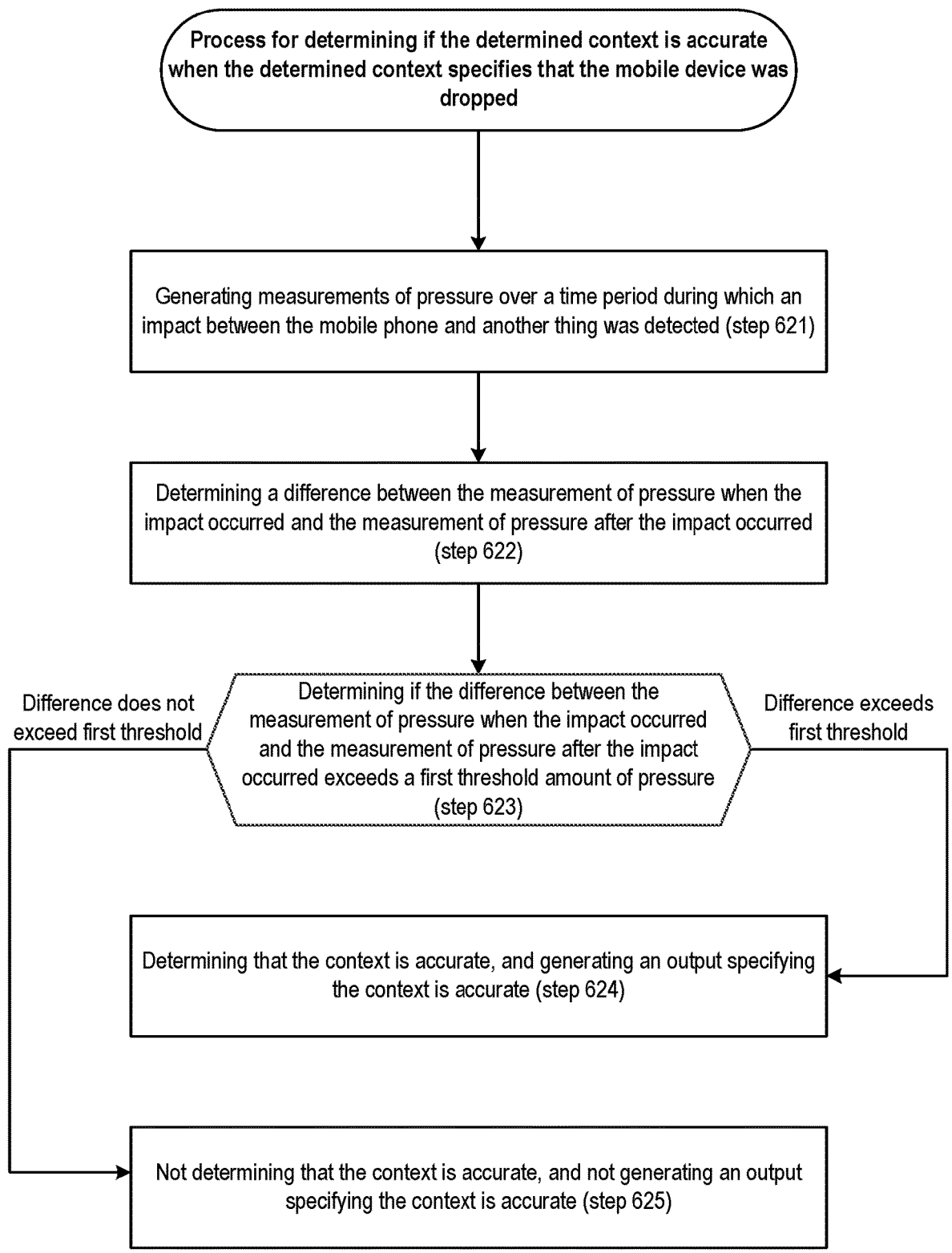
FIG. 6 depicts a process for determining if the determined context is accurate when the determined context specifies that the mobile device has been dropped.

FIG. 6 depicts a process for determining if the determined context is accurate when the determined context specifies that the mobile device has been dropped.

During the process, a pressure sensor of the mobile device is used to generate measurements of pressure over a time period during which an impact between the mobile phone and another thing was detected (step 621). The measurements of pressure include a measurement of pressure when the impact occurred, and a measurement of pressure after the impact occurred. By way of example, an impact between the mobile device and another thing can be detected by measuring the maximum or peak acceleration of the inertial sensor in any direction, or in the combined magnitude of all directions, and determining it exceeds a threshold acceleration such as 1000G. The measurement of pressure after the impact may be made at any time, but is preferably made soon after impact (e.g., within a few seconds after impact).

After pressure measurements are generated, a difference between the measurement of pressure when the impact occurred and the measurement of pressure after the impact occurred is determined (step 622), and a determination is made as to whether the difference between the measurement of pressure when the impact occurred and the measurement of pressure after the impact occurred exceeds a first threshold amount of pressure (step 623). In one implementation of step 623, the first threshold amount of pressure is at least 100 Pa, but other threshold amounts may be used in other implementations.

If the difference between the measurement of pressure when the impact occurred and the measurement of pressure after the impact occurred exceeds the first threshold amount of pressure, a determination that the context is accurate is made, and an output specifying the context is accurate is generated (step 624)—e.g., since the impact is likely to register as a large, transient value on the pressure sensor.

If the difference between the measurement of pressure when the impact occurred and the measurement of pressure after the impact occurred does not exceed the first threshold amount of pressure, no determination that the context is accurate is made, and an output specifying the context is accurate is not generated (step 625). Some embodiments include additional operations during step 625. In one embodiment, step 625 further includes: determining that it is not possible to determine that the context is accurate; and generating an output specifying it is not possible to determine that the context is accurate. In another embodiment, step 625 further includes: determining that the context is inaccurate; and generating output specifying the context is inaccurate. In yet another embodiment of step 625, a determination is made as to whether the difference between the measurement of pressure when the impact occurred and the measurement of pressure after the impact occurred exceeds a second threshold amount of pressure that is less than the first threshold amount of pressure—e.g., the second threshold amount of pressure is at least 50 Pa, but other threshold amounts may be used in other implementations. If the difference between the measurement of pressure when the impact occurred and the measurement of pressure after the impact occurred exceeds the second threshold amount of pressure, a determination that the mobile phone was possibly squeezed by another thing (e.g., in luggage or a pocket, or by a user's hand) is made, and an output specifying that the mobile phone was possibly squeezed by another thing is generated (or, since the impact is fairly large but not the expected amount for a typical drop from 1 meter or more, a determination that it is not possible to determine that the context is accurate could be alternatively made, and an output specifying it is not possible to determine that the context is accurate could be generated). If the difference between the measurement of pressure when the impact occurred and the measurement of pressure after the impact occurred does not exceed the second threshold amount of pressure, a determination that the mobile phone was possibly impacted or tapped by another thing (e.g., a user's finger, a wall or desk the mobile device bumped into, or an object that fell onto the mobile device) is made, and an output specifying that the mobile phone was possibly impacted by another thing is generated.

Figure 7:
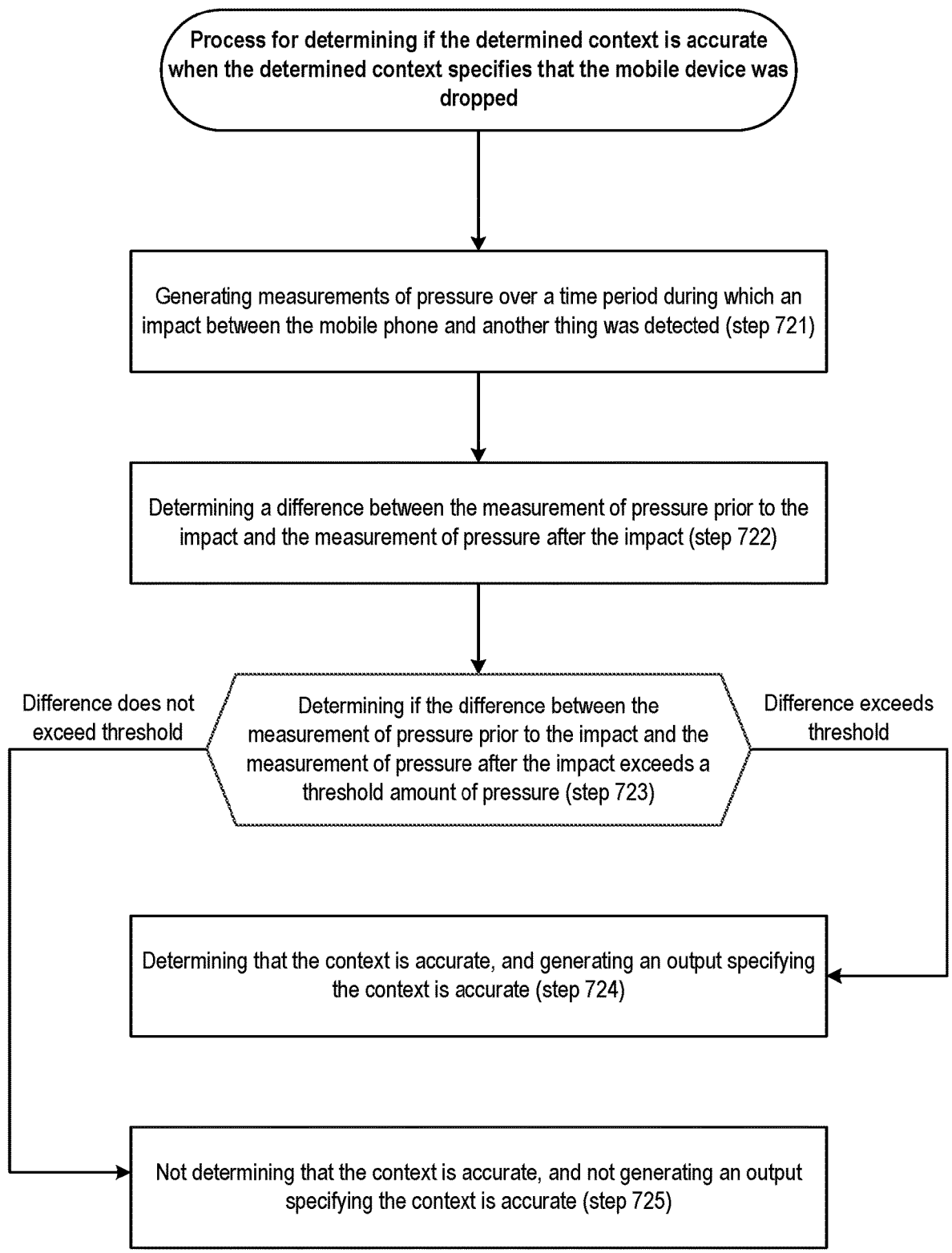
FIG. 7 depicts another process for determining if the determined context is accurate when the determined context specifies that the mobile device has been dropped.

FIG. 7 depicts another process for determining if the determined context is accurate when the determined context specifies that the mobile device has been dropped.

During the process, a pressure sensor of the mobile device is used to generate measurements of pressure over a time period during which an impact between the mobile phone and another thing was detected (step 721). The measurements of pressure include a measurement of pressure prior to when the impact occurred, and a measurement of pressure after the impact occurred. The measurements of pressure before and after the impact may be made at any time, but are preferably made soon before and after impact (e.g., within a few seconds before and after impact). In some implementations, the measurement of pressure made before the impact may need to be retrieved from stored historical pressure data.

After pressure measurements are generated, a difference between the measurement of pressure prior to the impact and the measurement of pressure after the impact is determined (step 722), and a determination is made as to whether the difference between the measurement of pressure prior to the impact and the measurement of pressure after the impact exceeds a threshold amount of pressure (step 723). In one implementation of step 723, the threshold amount of pressure is at least 10 Pa, but other threshold amounts may be used in other implementations.

If the difference between the measurement of pressure prior to the impact and the measurement of pressure after the impact exceeds the threshold amount of pressure, a determination that the context is accurate is made, and an output specifying the context is accurate is generated (step 724)— e.g., since the difference in pressure likely represents a difference in altitude between a location of the mobile device prior to being dropping and a location of the mobile device after being dropped.

If the difference between the measurement of pressure prior to the impact and the measurement of pressure after the impact does not exceed the threshold amount of pressure, no determination that the context is accurate is made, and no output specifying the context is accurate is generated (step 725). Some embodiments include additional operations during step 725. In one embodiment, step 725 further includes: determining that it is not possible to determine that the context is accurate; and generating an output specifying it is not possible to determine that the context is accurate. In another embodiment, step 725 further includes: determining that the context is inaccurate; and generating output specifying the context is inaccurate. In yet another embodiment, step 725 further includes: determining that the mobile phone was possibly tapped by another thing and generating an output specifying that the mobile phone was possibly tapped by another thing—e.g., a user's finger, a wall or desk the mobile device bumped, or an object that fell onto the mobile device.

Examples of Components for Performing Different Functions of the Processes Described Herein By way of example, but not by way of limitation, the following components can be used for performing (e.g., used to perform, be configured to perform, be adapted to perform, or be operable to perform) different steps of the process described herein as follows: generating measurements of pressure (e.g., a pressure sensor); determining different values, conclusions or other items (e.g., a processor); generating outputs (e.g., a processor and optionally a signal generator).

Technical Benefits

Processes described herein improve the fields of context determination for mobile devices by evaluating the accuracy of determined contexts. Determining a context of a mobile device has many valuable uses, including identification of desirable or undesirable circumstances for calibrating a pressure sensor of the mobile device or for computing an altitude of the mobile device using a calibrated pressure sensor of the mobile device, as well as other uses known in the art. The processes described herein make it possible to confirm that a determined context is accurate, determine when the accuracy of a determined context is suspect and should not be relied upon, or determine an alternative context to consider instead of the originally determined context. Each of these possibilities can be used to evaluate when to perform additional operations based on a particular context (e.g., to calibrate a pressure sensor or compute an altitude using the pressure sensor when the context specifies the location of the pressure sensor as being still in an environment within which there is no local pressure variation that would produce localized measurements of pressure that do not align with external pressure throughout the region).

Other Aspects

Any method (also referred to as a "process" or an "approach") described or otherwise enabled by disclosure herein may be implemented by hardware components (e.g., machines), software modules (e.g., stored in machine-readable media), or a combination thereof. In particular, any method described or otherwise enabled by disclosure herein may be implemented by any concrete and tangible system described herein. By way of example, machines may include one or more computing device(s), processor(s), controller(s), integrated circuit(s), chip(s), system(s) on a chip, server(s), programmable logic device(s), field programmable gate array(s), electronic device(s), special purpose circuitry, and/or other suitable device(s) described herein or otherwise known in the art. One or more non-transitory machine-readable media embodying program instructions that, when executed by one or more machines, cause the one or more machines to perform or implement operations comprising the steps of any of the methods described herein are contemplated herein. As used herein, machine-readable media includes all forms of machine-readable media, including but not limited to one or more non-volatile or volatile storage media, removable or non-removable media, integrated circuit media, magnetic storage media, optical storage media, or any other storage media, including RAM, ROM, and EEPROM, that may be patented under the laws of the jurisdiction in which this application is filed, but does not include machine-readable media that cannot be patented under the laws of the jurisdiction in which this application is filed. Methods disclosed herein provide sets of rules that are performed. Systems that include one or more machines and one or more non-transitory machine-readable media for implementing any method described herein are also contemplated herein. One or more machines that perform or implement, or are configured, operable or adapted to perform or implement operations comprising the steps of any methods described herein are also contemplated herein. Each method described herein that is not prior art represents a specific set of rules in a process flow that provides significant advantages in the field of using a pressure sensor of a mobile device to improve the reliability of determined contexts. Method steps described herein may be order independent and can be performed in parallel or in an order different from that described if possible to do so. Different method steps described herein can be combined to form any number of methods, as would be understood by one of ordinary skill in the art. Any method step or feature disclosed herein may be omitted from a claim for any reason. Certain well-known structures and devices are not shown in figures to avoid obscuring the concepts of the present disclosure. When two things are "coupled to" each other, those two things may be directly connected together, or separated by one or more intervening things. Where no lines or intervening things connect two particular things, coupling of those things is contemplated in at least one embodiment unless otherwise stated. Where an output of one thing and an input of another thing are coupled to each other, information sent from the output is received in its outputted form or a modified version thereof by the input even if the information passes through one or more intermediate things. Any known communication pathways and protocols may be used to transmit information (e.g., data, commands, signals, bits, symbols, chips, and the like) disclosed herein unless otherwise stated. The words comprise, comprising, include, including and the like are to be construed in an inclusive sense (i.e., not limited to) as opposed to an exclusive sense (i.e., consisting only of). Words using the singular or plural number also include the plural or singular number, respectively, unless otherwise stated. The word "or" and the word "and" as used in the Detailed Description cover any of the items and all of the items in a list unless otherwise stated. The words some, any and at least one refer to one or more. The terms may or can are used herein to indicate an example, not a requirement—e.g., a thing that may or can perform an operation, or may or can have a characteristic, need not perform that operation or have that characteristic in each embodiment, but that thing performs that operation or has that characteristic in at least one embodiment. Unless an alternative approach is described, access to data from a source of data may be achieved using known techniques (e.g., requesting component requests the data from the source via a query or other known approach, the source searches for and locates the data, and the source collects and transmits the data to the requesting component, or other known techniques).

FIG. 8 illustrates components of a transmitter, a mobile device, and a server. Examples of communication pathways are shown by arrows between components.

By way of example in FIG. 8, each of the transmitters may include: a mobile device interface 11 for exchanging information with a mobile device (e.g., an antenna and RF front end components known in the art or otherwise disclosed herein); one or more processor(s) 12; memory/data source 13 for providing storage and retrieval of information and/or program instructions; atmospheric sensor(s) 14 for measuring environmental conditions (e.g., pressure, temperature, other) at or near the transmitter; a server interface 15 for exchanging information with a server (e.g., an antenna, a network interface, or other); and any other components known to one of ordinary skill in the art. The memory/data source 13 may include memory storing software modules with executable instructions, and the processor(s) 12 may perform different actions by executing the instructions from the modules, including: (i) performance of part or all of the methods as described herein or otherwise understood by one of skill in the art as being performable at the transmitter; (ii) generation of positioning signals for transmission using a selected time, frequency, code, and/or phase; (iii) processing of signaling received from the mobile device or other source; or (iv) other processing as required by operations described in this disclosure. Signals generated and transmitted by a transmitter may carry different information that, once determined by a mobile device or a server, may identify the following: the transmitter; the transmitter's position; environmental conditions at or near the transmitter; and/or other information known in the art. The atmospheric sensor(s) 14 may be integral with the transmitter, or separate from the transmitter and either co-located with the transmitter or located in the vicinity of the transmitter (e.g., within a threshold amount of distance).

By way of example FIG. 8, the mobile device may include: a transmitter interface 21 for exchanging information with a transmitter (e.g., an antenna and RF front end components known in the art or otherwise disclosed herein); one or more processor(s) 22; memory/data source 23 for providing storage and retrieval of information and/or program instructions; atmospheric sensor(s) 24 for measuring environmental conditions (e.g., pressure, temperature, other) at the mobile device; other sensor(s) 25 for measuring other conditions (e.g., inertial sensors for measuring movement and orientation); a user interface 26 (e.g., display, keyboard, microphone, speaker, other) for permitting a user to provide inputs and receive outputs; another interface 27 for exchanging information with the server or other devices external to the mobile device (e.g., an antenna, a network interface, or other); and any other components known to one of ordinary skill in the art. A GNSS interface and processing unit (not shown) are contemplated, which may be integrated with other components (e.g., the interface 21 and the processors 22) or a standalone antenna, RF front end, and processors dedicated to receiving and processing GNSS signaling. The memory/data source 23 may include memory storing software modules with executable instructions, and the processor(s) 22 may perform different actions by executing the instructions from the modules, including: (i) performance of part or all of the methods as described herein or otherwise understood by one of ordinary skill in the art as being performable at the mobile device; (ii) estimation of an altitude of the mobile device based on measurements of pressure form the mobile device and transmitter(s), temperature measurement(s) from the transmitter(s) or another source, and any other information needed for the computation); (iii) processing of received signals to determine position information (e.g., times of arrival or travel time of the signals, pseudoranges between the mobile device and transmitters, transmitter atmospheric conditions, transmitter and/or locations or other transmitter information); (iv) use of position information to compute an estimated position of the mobile device; (v) determination of movement based on measurements from inertial sensors of the mobile device; (vi) GNSS signal processing; or (vii) other processing as required by operations described in this disclosure.

By way of example FIG. 8, the server may include: a mobile device interface 31 for exchanging information with a mobile device (e.g., an antenna, a network interface, or other); one or more processor(s) 32; memory/data source 33 for providing storage and retrieval of information and/or program instructions; a transmitter interface 34 for exchanging information with a transmitter (e.g., an antenna, a network interface, or other); and any other components known to one of ordinary skill in the art. The memory/data source 33 may include memory storing software modules with executable instructions, and the processor(s) 32 may perform different actions by executing instructions from the modules, including: (i) performance of part or all of the methods as described herein or otherwise understood by one of ordinary skill in the art as being performable at the server; (ii) estimation of an altitude of the mobile device; (iii) computation of an estimated position of the mobile device; or (iv) other processing as required by operations described in this disclosure. Steps performed by servers as described herein may also be performed on other machines that are remote from a mobile device, including computers of enterprises or any other suitable machine.

Certain aspects disclosed herein relate to estimating the positions of mobile devices—e.g., where the position is represented in terms of: latitude, longitude, and/or altitude coordinates; x, y, and/or z coordinates; angular coordinates; or other representations. Various techniques to estimate the position of a mobile device can be used, including trilateration, which is the process of using geometry to estimate the position of a mobile device using distances traveled by different "positioning" (or "ranging") signals that are received by the mobile device from different beacons (e.g., terrestrial transmitters and/or satellites). If position information like the transmission time and reception time of a positioning signal from a beacon are known, then the difference between those times multiplied by speed of light would provide an estimate of the distance traveled by that positioning signal from that beacon to the mobile device. Different estimated distances corresponding to different positioning signals from different beacons can be used along with position information like the locations of those beacons to estimate the position of the mobile device. Positioning systems and methods that estimate a position of a mobile device (in terms of latitude, longitude and/or altitude) based on positioning signals from beacons (e.g., transmitters, and/or satellites) and/or atmospheric measurements are described in co-assigned U.S. Pat. No. 8,130,141, issued Mar. 6, 2012, and U.S. Pat. Pub. No. 2012/0182180, published Jul. 19, 2012. It is noted that the term "positioning system" may refer to satellite systems (e.g., Global Navigation Satellite Systems (GNSS) like GPS, GLONASS, Galileo, and Compass/Beidou), terrestrial transmitter systems, and hybrid satellite/terrestrial systems.

This application relates to the following related application(s): U.S. Pat. Appl. No. 62/870,717, filed 2019 Jul. 4, entitled SYSTEMS AND METHODS FOR USING A PRESSURE SENSOR OF A MOBILE DEVICE TO IMPROVE THE RELIABILITY OF DETERMINED CONTEXTS. The content of each of the related application(s) is hereby incorporated by reference herein in its entirety.

The invention claimed is:

1. A method for using a pressure sensor of a mobile device to improve the reliability of determined contexts, the method comprising:
   determining a context of a mobile device; and
   determining if the determined context is accurate using one or more measurements of pressure from a pressure sensor of the mobile device;
   wherein the determined context specifies that the mobile device is in a motorized vehicle, and wherein determining if the determined context is accurate using one or more measurements of pressure from the pressure sensor of the mobile device comprises:
   determining a number of measurements of pressure using the pressure sensor of the mobile device during a time range;
   calculating a distribution of the measurements of pressure;
   determining if a percentage amount of a spread of the distribution is greater than a threshold amount of pressure;
   if the percentage amount of the spread is greater than the threshold amount of pressure, determining that the context is accurate, and generating an output specifying the context is accurate; and
   if the percentage amount of the spread is not greater than the threshold amount of pressure, not determining that the context is accurate, and not generating the output specifying the context is accurate.

2. The method of claim 1, wherein the method comprises:
   determining a wind speed;
   determining if the wind speed is less than a threshold amount of wind speed,
   wherein determining that the context is accurate and generating an output specifying the context is accurate if the percentage amount of the spread is greater than the threshold amount of pressure comprises:
   (i) if the wind speed is less than the threshold amount of wind speed, determining that the context is accurate, and generating the output specifying the context is accurate; and
   (ii) if the wind speed is not less than the threshold amount of wind speed, not determining that the context is accurate, and not generating the output specifying the context is accurate.

3. The method of claim 1, the method comprises:
   (i) if the percentage amount of the spread is not greater than the threshold amount of pressure, determining that it is not possible to determine that the context is accurate, and generating an output specifying it is not possible to determine that the context is accurate;
   (ii) if the percentage amount of the spread is not greater than the threshold amount of pressure, determining that the context is inaccurate, and generating output specifying the context is inaccurate; or
   (iii) if the percentage amount of the spread is not greater than the threshold amount of pressure, determining that the context is inaccurate, and generating output specifying that the mobile device is with a user who is walking or riding a bike.

4. A method for using a pressure sensor of a mobile device to improve the reliability of determined contexts, the method comprising:
   determining a context of a mobile device; and
   determining if the determined context is accurate using one or more measurements of pressure from a pressure sensor of the mobile device;
   wherein the determined context specifies the mobile device is with a user who is walking, and wherein determining if the determined context is accurate using one or more measurements of pressure from the pressure sensor of the mobile device comprises:
   generating measurements of pressure using the pressure sensor of the mobile device during a time range, wherein the measurements of pressure include a first pressure measurement determined at or near the beginning of the time range, and a second pressure measurement determined at or near the end of the time range;
   determining a characteristic of the measurements of pressure;

determining if the characteristic meets a threshold condition;

if the characteristic meets the threshold condition, determining that the context is accurate, and generating an output specifying the context is accurate; and if the characteristic does not meet the threshold condition, not determining that the context is accurate, and not generating the output specifying the context is accurate.

5. The method of claim 4,
wherein determining a characteristic of the measurements of pressure comprises determining a difference between the first pressure measurement and the second pressure measurement, wherein determining if the characteristic meets a threshold condition comprises determining if the difference between the first pressure measurement and the second pressure measurement is greater than a threshold amount of pressure, wherein the characteristic meets the threshold condition when the difference between the first pressure measurement and the second pressure measurement is greater than the threshold amount of pressure, and wherein the characteristic does not meet the threshold condition when the difference between the first pressure measurement and the second pressure measurement is not greater than the threshold amount of pressure.

6. The method of claim 4,
wherein determining a characteristic of the measurements of pressure comprises determining a trendline of the measurements of pressure throughout the time range, wherein determining if the characteristic meets a threshold condition comprises determining if a magnitude of a slope of the trendline is greater than a threshold amount of pressure per unit of time, wherein the characteristic meets the threshold condition when the magnitude of the slope of the trendline is greater than the threshold amount of pressure per unit of time, and wherein the characteristic does not meet the threshold condition when the magnitude of the slope of the trendline is not greater than the threshold amount of pressure per unit of time.

7. The method of claim 4,
wherein determining a characteristic of the measurements of pressure comprises determining a distribution of the measurements of pressure, wherein determining if the characteristic meets a threshold condition comprises determining if a percentage amount of a spread of the distribution is less than a threshold amount of pressure, wherein the characteristic meets the threshold condition when the percentage amount of the spread of the distribution is less than the threshold amount of pressure, and wherein the characteristic does not meet the threshold condition when the percentage amount of the spread of the distribution is not less than the threshold amount of pressure.

8. The method of claim 4, the method comprises:
(i) if the characteristic does not meet the threshold condition, determining that it is not possible to determine that the context is accurate, and generating an output specifying it is not possible to determine that the context is accurate; or (ii) if the characteristic does not meet the threshold condition, determining that the context is inaccurate, and generating output specifying the context is inaccurate.

9. One or more non-transitory machine-readable media embodying program instructions that, when executed by one or more machines, cause the one or more machines to implement the method of claim 1.

10. A method for using a pressure sensor of a mobile device to improve the reliability of determined contexts, the method comprising:
determining a context of a mobile device; and
determining if the determined context is accurate using one or more measurements of pressure from a pressure sensor of the mobile device;

wherein the determined context specifies the mobile device is still, and wherein determining if the determined context is accurate using one or more measurements of pressure from the pressure sensor of the mobile device comprises:

generating measurements of pressure using the pressure sensor of the mobile device during a time range, wherein the measurements of pressure include a first pressure measurement determined at or near the beginning of the time range, and a second pressure measurement determined at or near the end of the time range;

determining a characteristic of the measurements of pressure;

determining if the characteristic meets a threshold condition;

if the characteristic meets the threshold condition, determining that the context is inaccurate, and generating output specifying the context is inaccurate; and if the characteristic does not meet the threshold condition, determining that it is not possible to determine that the context is accurate, and generating an output specifying it is not possible to determine that the context is accurate.

11. The method of claim 10,
wherein determining a characteristic of the measurements of pressure comprises determining a difference between the first pressure measurement and the second pressure measurement, wherein determining if the characteristic meets a threshold condition comprises determining if the difference between the first pressure measurement and the second pressure measurement is greater than a threshold amount of pressure, wherein the characteristic meets the threshold condition when the difference between the first pressure measurement and the second pressure measurement is greater than the threshold amount of pressure, and wherein the characteristic does not meet the threshold condition when the difference between the first pressure measurement and the second pressure measurement is not greater than the threshold amount of pressure.

12. The method of claim 10,
wherein determining a characteristic of the measurements of pressure comprises determining a trendline of the measurements of pressure throughout the time range, wherein determining if the characteristic meets a threshold condition comprises determining if a magnitude of a slope of the trendline is greater than a threshold amount of pressure per unit of time, wherein the characteristic meets the threshold condition when the magnitude of the slope of the trendline is greater than the threshold amount of pressure per unit of time, and wherein the characteristic does not meet the threshold condition when the magnitude of the slope of the trendline is not greater than the threshold amount of pressure per unit of time.

13. The method of claim 10, wherein determining a characteristic of the measurements of pressure comprises determining a distribution of the measurements of pressure, wherein determining if the characteristic meets a threshold condition comprises determining if a percentage amount of a spread of the distribution is greater than a threshold amount of pressure, wherein the characteristic meets the threshold condition when the percentage amount of the spread of the distribution is greater than the threshold amount of pressure, and wherein the characteristic does not meet the threshold condition when the percentage amount of the spread of the distribution is not greater than the threshold amount of pressure.

14. A method for using a pressure sensor of a mobile device to improve the reliability of determined contexts, the method comprising:

determining a context of a mobile device; and determining if the determined context is accurate using one or more measurements of pressure from a pressure sensor of the mobile device;

wherein the determined context specifies the mobile device has been dropped, and wherein determining if the determined context is accurate using one or more measurements of pressure from the pressure sensor of the mobile device comprises:

generating measurements of pressure over a time period during which an impact between the mobile device and another thing was detected, wherein the measurements of pressure include a measurement of pressure when the impact occurred, and a measurement of pressure after the impact occurred;

determining a difference between the measurement of pressure when the impact occurred and the measurement of pressure after the impact occurred;

determining if the difference between the measurement of pressure when the impact occurred and the measurement of pressure after the impact occurred exceeds a first threshold amount of pressure;

if the difference between the measurement of pressure when the impact occurred and the measurement of pressure after the impact occurred exceeds the first threshold amount of pressure, determining that the context is accurate, and generating an output specifying the context is accurate; and if the difference between the measurement of pressure when the impact occurred and the measurement of pressure after the impact occurred does not exceed the first threshold amount of pressure, not determining that the context is accurate, and not generating an output specifying the context is accurate.

15. The method of claim 14, the method comprises:

(i) if the difference between the measurement of pressure when the impact occurred and the measurement of pressure after the impact occurred does not exceed the first threshold amount of pressure, determining that it is not possible to determine that the context is accurate, and generating an output specifying it is not possible to determine that the context is accurate; or (ii) if the difference between the measurement of pressure when the impact occurred and the measurement of pressure after the impact occurred does not exceed the first threshold amount of pressure, determining that the context is inaccurate, and generating output specifying the context is inaccurate.

16. The method of claim 14, the method comprises:

if the difference between the measurement of pressure when the impact occurred and the measurement of pressure after the impact occurred does not exceed the first threshold amount of pressure, (i) determining if the difference between the measurement of pressure when the impact occurred and the measurement of pressure after the impact occurred exceeds a second threshold amount of pressure that is less than the first threshold amount of pressure, (ii) if the difference between the measurement of pressure when the impact occurred and the measurement of pressure after the impact occurred exceeds the second threshold amount of pressure, determining that the mobile device was possible squeezed by another thing and generating an output specifying that the mobile device was possible squeezed by another thing, and (iii) if the difference between the measurement of pressure when the impact occurred and the measurement of pressure after the impact occurred does not exceed the second threshold amount of pressure, determining that the mobile device was possibly tapped by another thing and generating an output specifying that the mobile device was possibly tapped by another thing.

17. A method for using a pressure sensor of a mobile device to improve the reliability of determined contexts, the method comprising:

determining a context of a mobile device; and determining if the determined context is accurate using one or more measurements of pressure from a pressure sensor of the mobile device;

wherein the determined context specifies the mobile device has been dropped, and wherein determining if the determined context is accurate using one or more measurements of pressure from the pressure sensor of the mobile device comprises:

generating measurements of pressure over a time period during which an impact between the mobile device and another thing was detected, wherein the measurements of pressure include a measurement of pressure prior to when the impact occurred, and a measurement of pressure after the impact occurred;

determining a difference between the measurement of pressure prior to the impact and the measurement of pressure after the impact;

determining if the difference between the measurement of pressure prior to the impact and the measurement of pressure after the impact exceeds a threshold amount of pressure;

if the difference between the measurement of pressure prior to the impact and the measurement of pressure after the impact exceeds the threshold amount of pressure, determining that the context is accurate, and generating an output specifying the context is accurate; and if the difference between the measurement of pressure prior to the impact and the measurement of pressure after the impact does not exceed the threshold amount of pressure, not determining that the context is accurate, and not generating an output specifying the context is accurate.

18. The method of claim 17, the method comprises:

(i) if the difference between the measurement of pressure when the impact occurred and the measurement of pressure after the impact occurred does not exceed the threshold amount of pressure, determining that it is not possible to determine that the context is accurate, and generating an output specifying it is not possible to determine that the context is accurate; or (ii) if the difference between the measurement of pressure when the impact occurred and the measurement of pressure after the impact occurred does not exceed the threshold amount of pressure, determining that the mobile device was possibly tapped by another thing and generating an output specifying that the mobile device was possibly tapped by another thing.

* * * * *